United States Patent
Shepard (10) Patent No.: US 9,444,294 B2
(45) Date of Patent: Sep. 13, 2016

(54) SPLIT ROTOR MULTIPHASE GENERATOR

(71) Applicant: CARINO ENERGY RENEWABLES LTD., Nevis, West Indies (KN)

(72) Inventor: Joe D. Shepard, Deltona, FL (US)

(73) Assignee: CARINO ENERGY RENEWABLES LTD. (KN)

( * ) Notice: Subject to any disclaimer, the term of this patent is extended or adjusted under 35 U.S.C. 154(b) by 0 days.

(21) Appl. No.: 14/995,245

(22) Filed: Jan. 14, 2016

(65) Prior Publication Data

US 2016/0233731 A1    Aug. 11, 2016

Related U.S. Application Data

(60) Provisional application No. 62/113,397, filed on Feb. 7, 2015.

(51) Int. Cl.

| H02K 7/20 | (2006.01) |
|---|---|
| H02K 1/22 | (2006.01) |
| H02K 5/20 | (2006.01) |
| H02K 11/04 | (2016.01) |
| H02K 3/04 | (2006.01) |
| H02K 1/12 | (2006.01) |

(52) U.S. Cl.
CPC *H02K 1/22* (2013.01); *H02K 1/12* (2013.01); *H02K 3/04* (2013.01); *H02K 5/20* (2013.01); *H02K 11/046* (2013.01)

(58) Field of Classification Search
CPC ..... H02K 16/00; H02K 16/02; H02K 16/025

USPC ................ 310/112–114, 156.35–156.37, 266
See application file for complete search history.

(56) References Cited

U.S. PATENT DOCUMENTS

| 4,134,054 A | * | 1/1979 | Akamatsu | H02K 19/20 310/112 |
|---|---|---|---|---|
| 5,646,466 A | * | 7/1997 | Noji | H02K 3/47 310/112 |
| 6,788,022 B2 | * | 9/2004 | Sopko | H02P 25/18 310/112 |
| 2011/0234145 A1 | * | 9/2011 | Langreck | H02K 1/148 318/720 |
| 2012/0280587 A1 | * | 11/2012 | Flynn | H02K 19/103 310/114 |

* cited by examiner

*Primary Examiner* — Thanh Lam
(74) *Attorney, Agent, or Firm* — Allen Dyer Doppelt Milbrath & Gilchrist (57) ABSTRACT

A generator comprises a rotor assembly having a first rotor and a second rotor located about a shaft along a rotational axis. Each rotor includes a plurality of magnets circumferentially located about the rotational axis. The first rotor and the second rotor are separated by a gap, and adjacent magnets around each rotor and between the first rotor and the second rotor are aligned to have alternating polarity. The generator further comprises a stator assembly having a first stator and a second stator located about the shaft. The first stator inner surface is in close proximity to the first rotor outer surface and the second stator inner surface is in close proximity to the second rotor outer surface. Each stator includes a plurality of conductors circumferentially located about the shaft and proximal to the plurality of magnets of a corresponding rotor.

20 Claims, 7 Drawing Sheets

SPLIT ROTOR MULTIPHASE GENERATOR

CROSS-REFERENCE TO RELATED APPLICATION

This application claims the benefit of U.S. Provisional Patent Application Ser. No. 62/113,397, filed on Feb. 7, 2015, the contents of which applications are herein incorporated by reference in their entirety.

FIELD OF THE INVENTION

The present invention relates to the field of electrical generators, and more particularly, to multiphase electrical generators that employ split rotors.

BACKGROUND OF THE INVENTION

Electrical generators have long been used to generate multiphase current output. Traditional three-phase generators, for instance, produce a power output that reaches the peak value every one-third of a cycle. This ripple effect is undesirable for some purposes, necessitating processing before the generator signal can be applied to a load. Moreover, most current generators do not employ effective control systems for dynamic monitoring of the operating parameters of the generator or load. The operation of a generator can consequently be less efficient than desired. Further developments could improve the efficiency of electrical generators.

SUMMARY OF THE INVENTION

In view of the foregoing, it is an object of the present invention to provide a multiphase generator that employs split rotors and a control mechanism. According to an embodiment of the invention, a generator comprises a rotor assembly having a first rotor and a second rotor located about a shaft along a rotation axis. Each rotor includes a plurality of magnets located at a fixed distance from the rotation axis. The first rotor and the second rotor are separated by a gap, and adjacent magnets around each rotor and between the first rotor and the second rotor are aligned to have alternating polarity. The generator further comprises a stator assembly having a first stator and a second stator located about the shaft. The inner surface of the first stator is in close proximity to the outer surface of the first rotor, and the inner surface of the second stator is in close proximity to the outer surface of the second rotor. Each stator includes a plurality of conductors located about the shaft and proximal to the plurality of magnets of the corresponding rotor. A rotor assembly and its respective stator assembly are in a rotational relationship with each other. The plurality of conductors on the first stator and the second stator are configured to generate N-phase outputs, where N is an integer.

The generator further comprises a rectifying system configured for processing the electrical output of the plurality of conductors and generating a final output.

The generator further comprises a monitoring system configured for controlling operation of the rectifying system based on operation parameters of the generator.

These and other objects, aspects and advantages of the present invention will be better appreciated in view of the drawings and following detailed description of preferred embodiments.

DETAILED DESCRIPTION OF PREFERRED EMBODIMENTS

The present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and fully convey the scope of the invention to those skilled in the art.

According to an embodiment of the present invention, a generator comprises a rotor assembly having a first rotor and a second rotor located about a shaft along a rotational axis. Each rotor includes a plurality of magnets (e.g., epoxy-coated N52 neodymium magnets) located along the circumference of a circle that is perpendicular to the rotation axis and the center of which lies on the rotation axis. The first rotor and the second rotor are separated by a gap, and adjacent magnets around each rotor and between the first rotor and the second rotor are aligned to have alternating polarity.

The generator further comprises a stator assembly having a first stator and a second stator located about the shaft. The inner surface of the first stator is in close proximity to the outer surface of the first rotor, and the inner surface of the second stator is in close proximity to the outer surface of the second rotor. Each stator includes a plurality of conductors located about the shaft and proximal to the plurality of magnets of a corresponding rotor. The rotor assembly and the stator assembly are in a rotational relationship with one another. The plurality of conductors on the first stator and the second stator are configured to generate N-phase outputs, wherein N is an integer. In one embodiment, the rotor assembly includes conductors and the stator assembly includes magnets.

Figure 1:
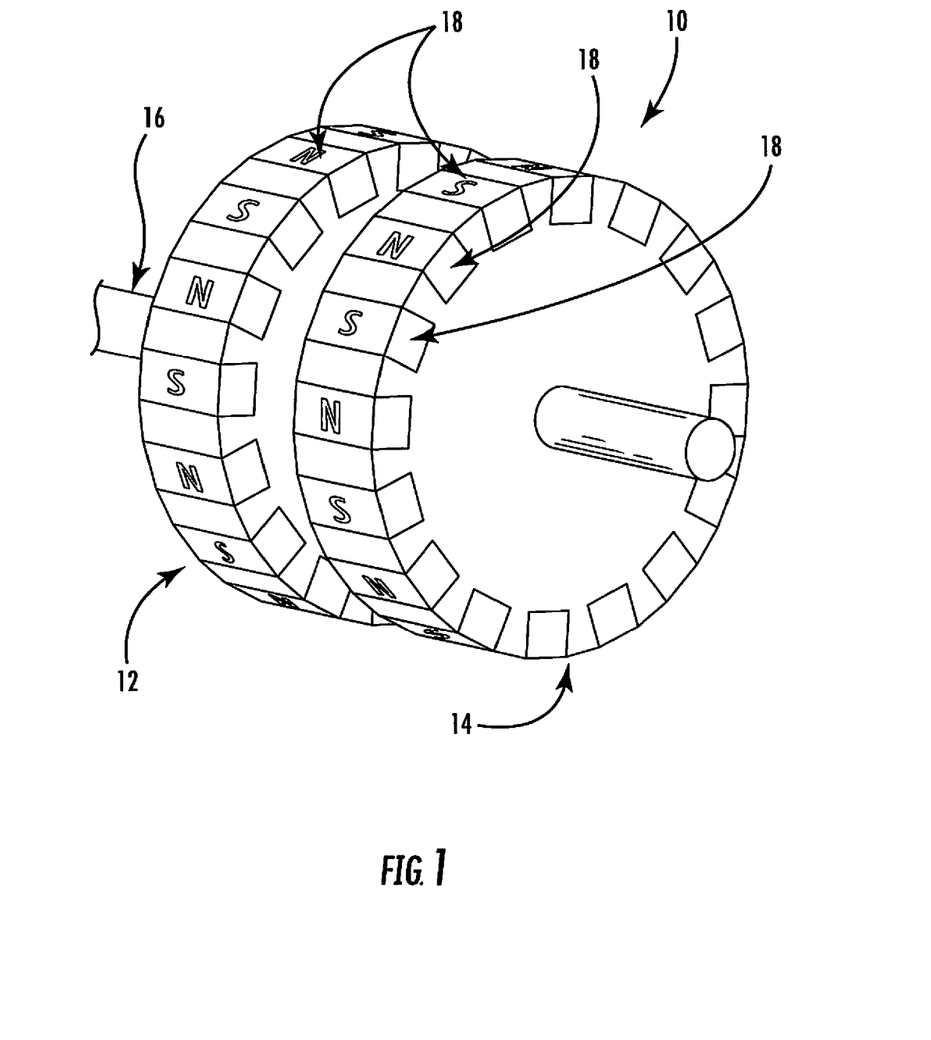
FIG. 1 is a perspective view of a rotor assembly employed in a multiphase generator according to an embodiment of the present invention.

Referring to FIG. 1, a rotor assembly 10 is shown. The rotor assembly 10 includes a first rotor 12 and a second rotor 14 located about a shaft 16 along a rotational axis. The first rotor 12 and the second rotor 14 each has a plurality of magnets circumferentially located about the shaft 16. The first rotor 12 and the second rotor 14 rotate about the shaft 16. The first rotor 14 and the second rotor 16 are separated by a gap. A plurality of magnets 18 are positioned around the first rotor 12 and the second rotor 14, and adjacent magnets around each rotor and between the first rotor and the second rotor are aligned to have alternating polarity. Specifically, north polarized magnets and the south polarized magnets are interleaved both around the rotors and between the rotors. The rotor shaft 16 can be connected to or include a turbine shaft.

Figure 2:
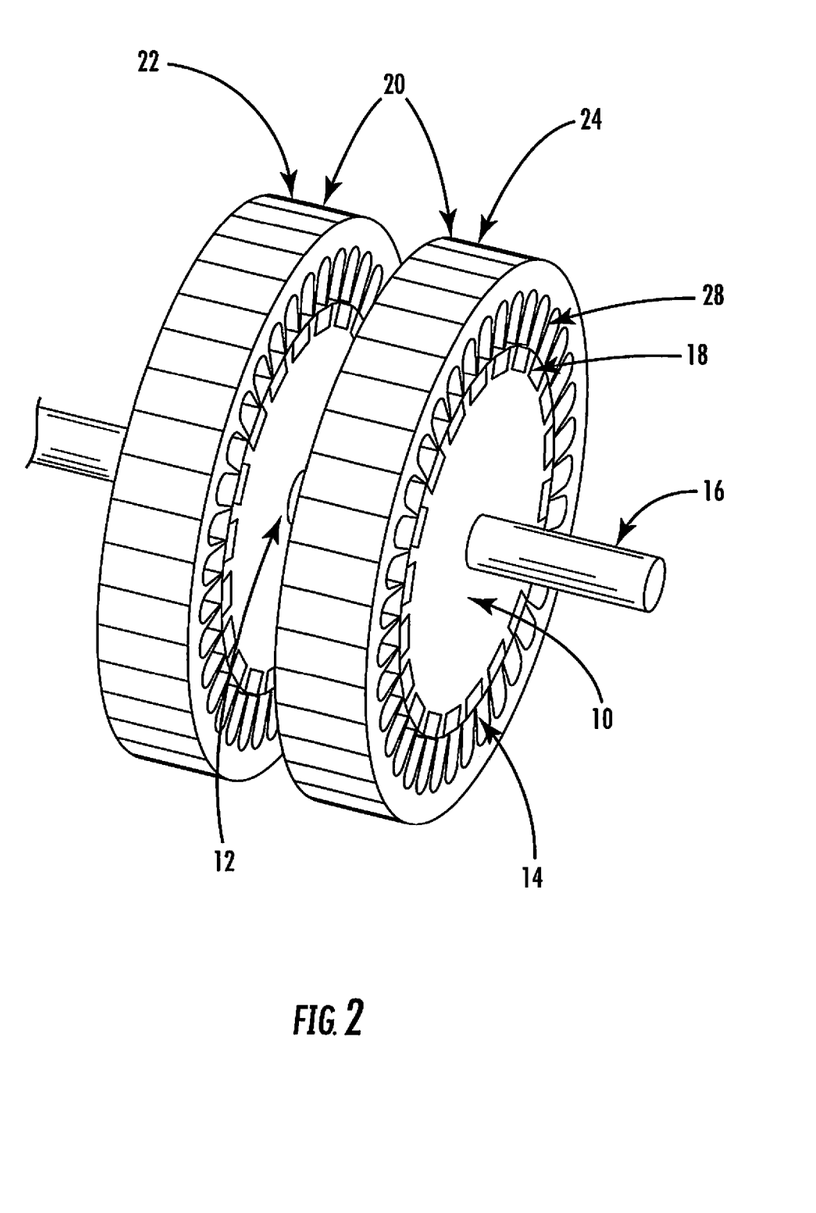
FIG. 2 is a perspective view of a rotor assembly and a stator assembly employed in a multiphase generator according to an embodiment of the present invention.

Referring to FIG. 2, the rotor assembly 10 and a stator assembly 20 located about a rotational shaft 16 are shown. The stator assembly 20 includes a first stator 22 and a second stator 24. The first stator 22 surrounds the circumference of the first rotor 12 and the second stator 24 surrounds the circumference of the second stator 24, and the inner surface of the first stator 22 is in close proximity to the outer surface of the first rotor 12. The second stator 24 surrounds the circumference of the second rotor 26, and the inner surface second stator 24 is in close proximity to the outer surface of the second rotor 14. The first rotor 12 and the second rotor 14 are spun within the first stators 22 and the second stator 24 respectively by the shaft 16. The first stator 20 includes a plurality of stator slots 28 configured to allow conductors (e.g., wire coils), to be placed therein. The plurality of magnets 18 are located on the first and second rotor's outer periphery and in close proximity to the stator slots 28 of the first stator 22 and the second stator 24.

Figure 3A:
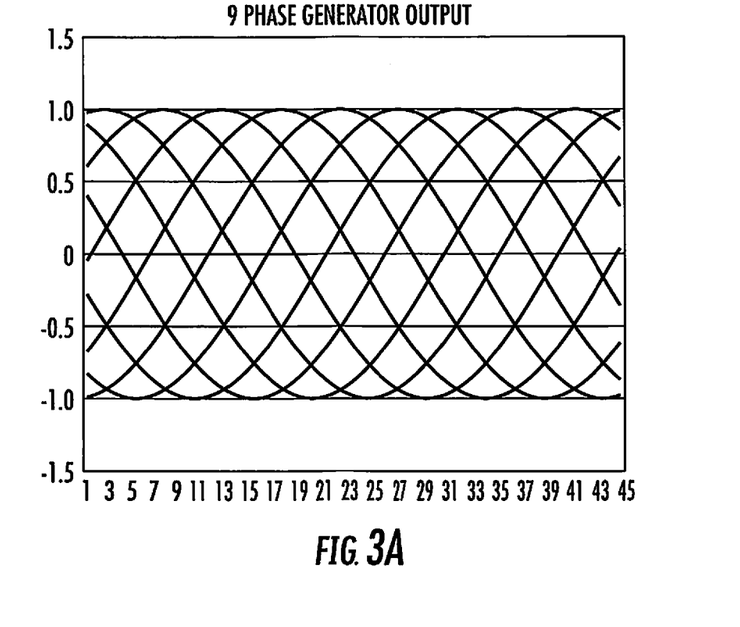
FIG. 3A is a diagram illustrating eighteen phase power output.
Figure 3B:
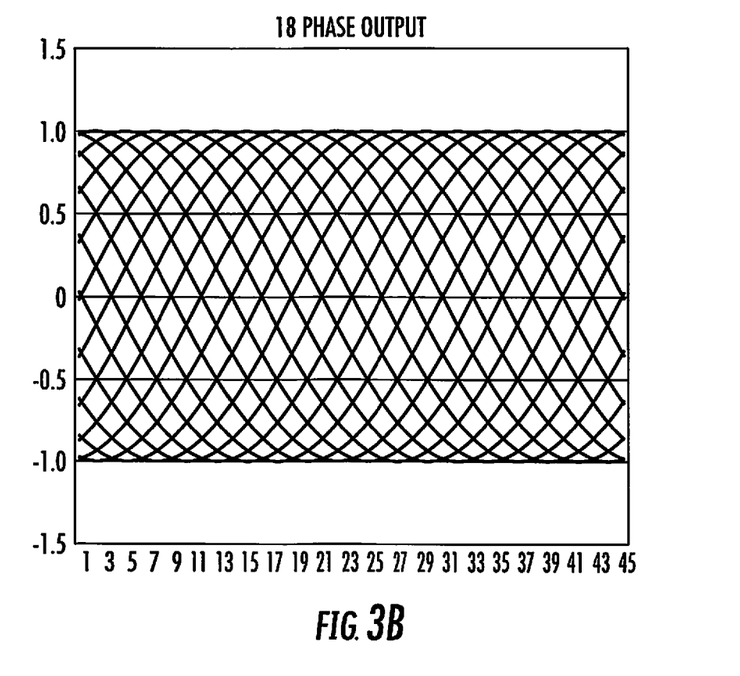
FIG. 3B is a diagram illustrating nine phase power output.

By employing split rotors, indexing the magnet polarity on the split rotors, and recombining the outputs, the power peaks is produced multiple times within each rotation. For example, a 9-phase or an 18-phase current output and/or N-phase voltage output can be generated. FIGS. 3A and 3B illustrate eighteen-phase power output and nine-phase power output, respectively. The electrical output (current or voltage) is smooth and requires minimal filtering. The number of power peaks can be further increased by adding more split rotors and indexing them around the rotational shaft 16.

The generator further includes a ventilated case with dissipation fins. The bearing of the generator is hybrid ceramic with a 10,000 revolutions per minute (RPM) rating. No brushes or other wear components are needed.

Figure 4:
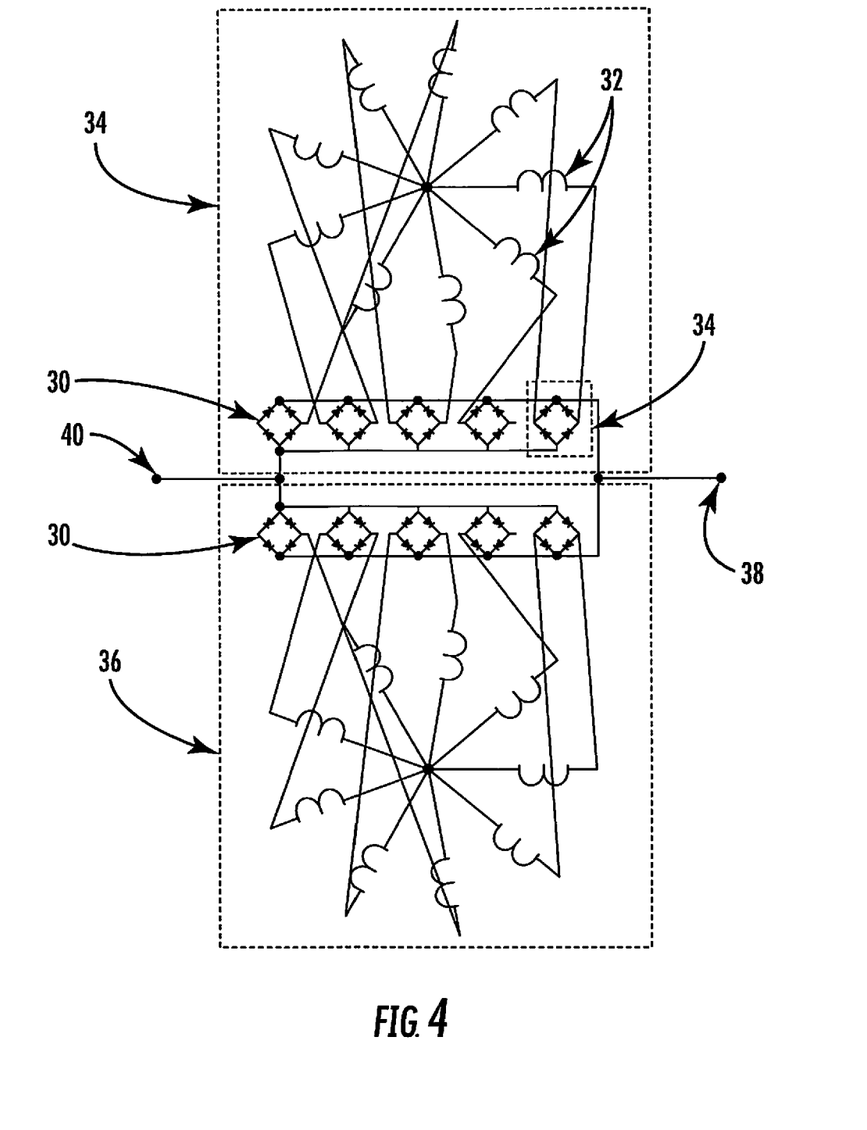
FIG. 4 is a diagram of another example rectifier system of the multiphase generator according to an embodiment of the present invention.

Referring to FIG. 4, an example connection between a rectifying system 30 and a plurality of conductors 36 is shown. The electrical output of the each conductor (wire coil) 32 of a first coil assembly 34 and a second coil assembly 36 pass through a rectifying system 30 to generate a final electrical output. In the depicted embodiment, a plurality of coils 36 in the first coil assembly 32 and the second coil assembly 34 is arranged in a star configuration and connected to a plurality of diode bridges 34 of the rectifying system. The rectified output from the first coil assembly 32 and the second coil assembly 34 are combined in a parallel as a final output, the final output is obtained between the positive output 38 and the negative output 40.

Figure 5:
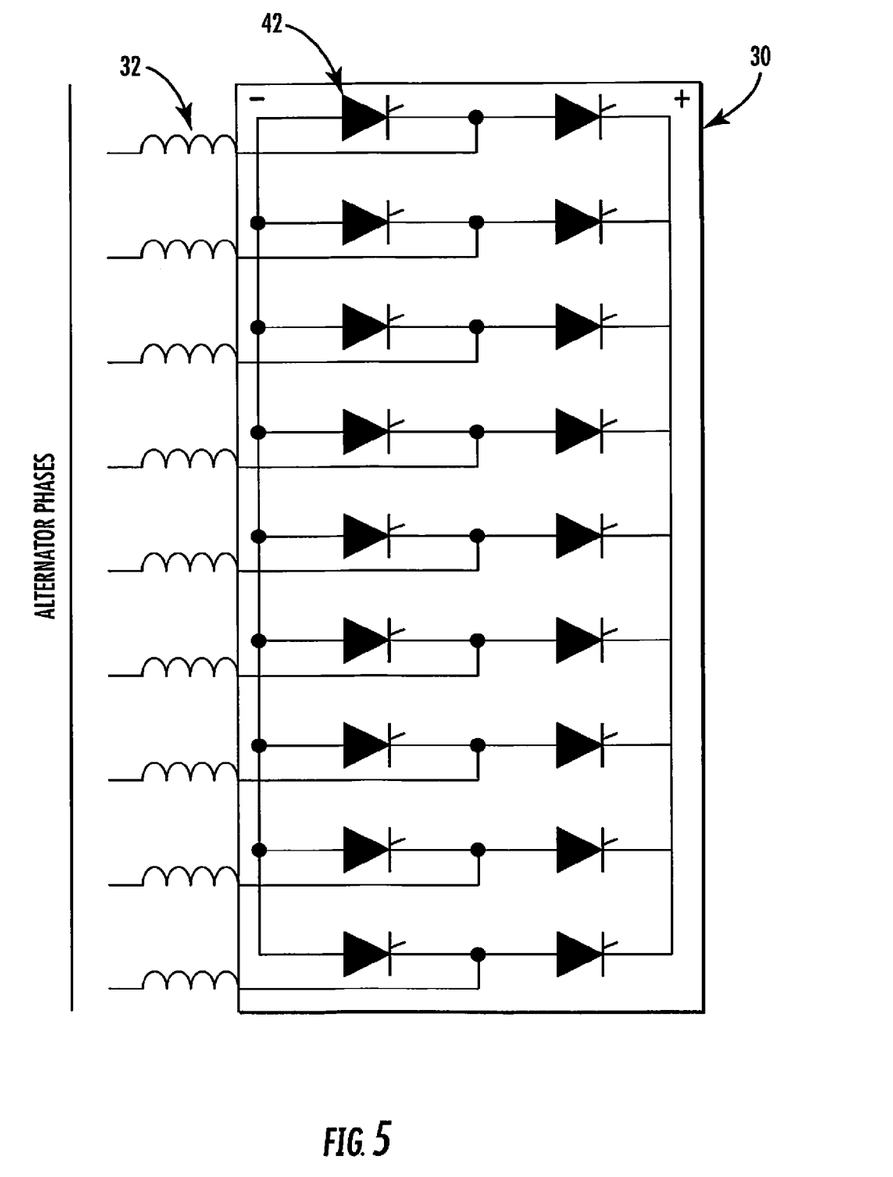
FIG. 5 is a diagram of an example rectifier system of the multiphase generator according to an embodiment of the present invention.

Referring to FIG. 5, another example connection between a rectifying system 30 and a plurality of conductors 32 is shown. The rectifying system 30 includes a plurality of silicon-controlled rectifiers (e.g., thyristors) 42. The silicon-controlled rectifier 42 associated with each conductor 32 is independently controlled.

In one embodiment, thyristors 42 are triggered at specific intervals based on the current load demand. For example, when the multiphase generator is adopted by a vehicle, and the current demand is low, the generator puts virtually no load on the vehicle's engine. This improves vehicle efficiency and reduces emissions. When the current demand is high, the generator produces precisely the current needed and thus limits the load on the engine.

Figure 6A:
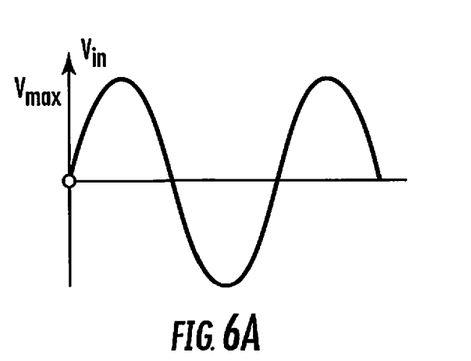
FIG. 6A is a diagram illustrating an example input voltage of a monitoring system of the multiphase generator according to an embodiment of the present invention.
Figure 6B:
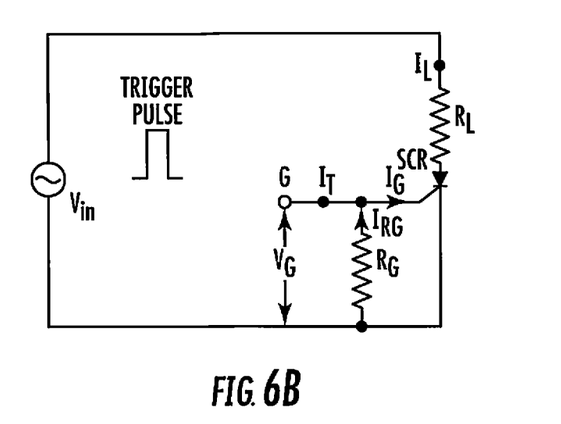
FIG. 6B is a diagram illustrating an example circuit of the multiphase generator according to an embodiment of the present invention.
Figure 6C:
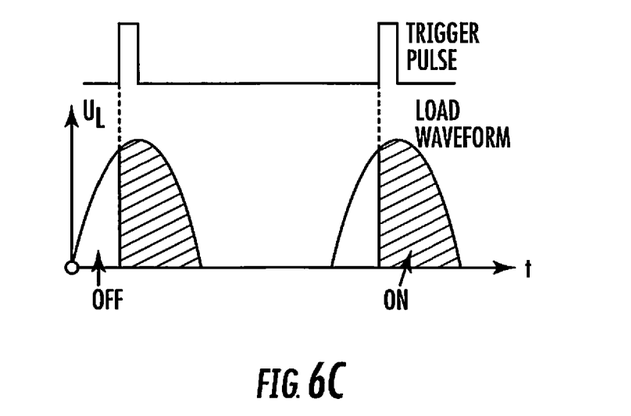
FIG. 6C is a diagram illustrating an example output voltage of a monitoring system of the multiphase generator according to an embodiment of the present invention.

Referring to FIGS. 6A-6C, AC output from a multiphase electrical generator is controlled by triggering a silicon-controlled rectifier (SCR) with a trigger pulse at a specific time. Once triggered, the silicon-controlled rectifier remains on until the applied input goes through zero. The "on" proportions are summed into the desired voltage and/or current. In one embodiment, a trigger pulse is generated by monitoring the transition and frequency of the AC signal coming from the generator and comparing the output voltage to a reference voltage. The sum or output voltage referred to the final output voltage as measured between the positive output and the negative outputs of the SCR. The reference voltage is a fixed value. If the output voltage goes down with respect to the reference voltage, it means more current is being drawn and the firing circuitry needs to compensate. It does so by adjusting the time to generate trigger pulse. For example, when the AC signal crosses the zero state line and starts to go positive with respect to ground, the system can determine when to fire the trigger pulse. For example, if the output voltage is lower than the reference voltage, the system will generate the trigger pulse slightly earlier than the previous excursion and will continue to do so with each successive excursion until the output voltage is raised to and equals the input voltage. This processed is reversed if the output voltage exceeds the input voltage. The voltage is thus controlled over a broad range of generator speeds and load variations.

Figure 7:
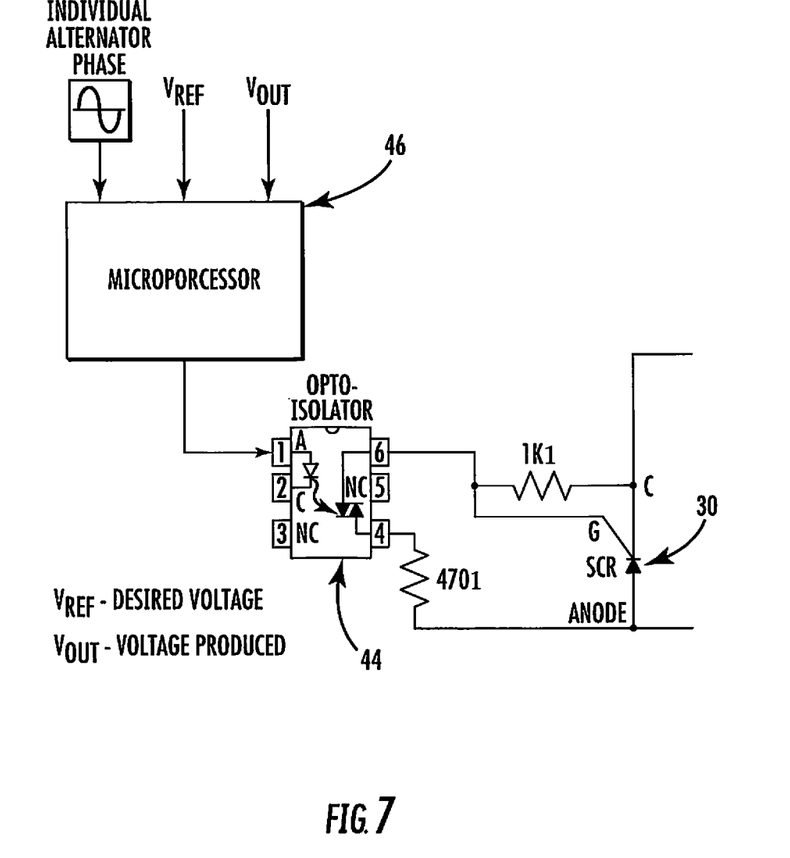
FIG. 7 is an example circuit configuration of a multiphase generator according to an embodiment of the present invention.

Referring to FIG. 7, the operation of the rectifying system 30 is connected to a monitoring system (microprocessor 46) via an optoisolator 44. The optoisolator 44 is operated based on signals of received from a microprocessor 46. The trigger of the thyristor 42 is activated by optoisolator 44 driving the gate of the thyristor 42.

The microprocessor 46 is configured to monitor operation parameters, for example, RPM, the current value, the voltage value, and the phase relation between the rotor assembly 10 and the stator assembly 20. The electrical generator thus provides a power that matches the load.

The synchronization of the trigger process is achieved by a monitoring system (e.g., microprocessor 46) sampling the output of each phase. The output of each phase and the gating trigger are monitored. The power delivered by each phase is monitored and the placement of trigger pulses is adjusted to ensure that each phase delivers the same current. For example, the monitoring system (e.g., microprocessor 46) compares an output voltage to a reference voltage and thus determines a time to trigger the SCR (e.g., tryristor) 42 in order to raise or lower the output voltage to match the reference. The optoisolator 42 receive the signals from the embedded microprocessor and triggers each SCE at a precise time. The monitoring system enables a precise control of the trigger time and eliminates the flux saturation occurs in pulse transformers.

The microprocessor 46 can be configured to fit any electronic configuration of the equipment or vehicle that employs an electrical generator. In one embodiment, the microprocessor 46 monitors and stores operation data of the electrical generator for analysis, learning and trouble-shooting purpose. For example, operation data such as climate condition, generator load, battery condition and the like are monitored by the microprocessor 46. The operation data can also be transmitted to the equipment or vehicle that employs the electrical generator.

In the description provided, how the parts of the generator are assembled is shown. The general wiring and mechanical positioning is described. This invention allows better conversion of mechanical energy to electrical energy.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A generator comprising:
   a rotor assembly having a first rotor and a second rotor located about a shaft along a rotational axis, each rotor having a plurality of magnets circumferentially located about the rotational axis, wherein the first rotor and the second rotor are separated by a gap, and adjacent magnets around each rotor and between the first rotor and the second rotor are aligned to have alternating polarity;
   a stator assembly having a first stator and a second stator located about the shaft, wherein the first stator inner surface is in close proximity to the first rotor outer surface and the second stator inner surface is in close proximity to the second rotor outer surface, each stator having a plurality of conductors circumferentially located about the shaft and proximal to the plurality of magnets of a corresponding rotor, the rotor assembly and the stator assembly are in a rotational relationship with one another, and wherein the plurality of conductors on the first stator and the second stator are configured to generate N phase outputs.

2. The generator of claim 1, wherein the rotor assembly includes conductors and the stator assembly includes magnets.

3. The generator of claim 1, wherein the conductors are wire coils.

4. The generator of claim 3, wherein the operation of the rectifying system is based on one or more of revolutions per minute (RPM), current value, voltage value, and phase relations between the rotor assembly and the stator assembly.

5. The generator of claim 3, wherein the rectifying system is connected to a plurality of optoisolators, and wherein the plurality of optoisolators are controlled by a microprocessor.

6. The generator of claim 5, wherein the microprocessor monitors operation parameters of the generator.

7. The generator of claim 1, wherein the electrical output of the plurality of conductors pass through a rectifying system to generate a final electrical output.

8. The generator of claim 7, wherein the rectifying system includes at least one silicon-controlled rectifier.

9. The generator of claim 1, further comprising a ventilated case with dissipation fins.

10. The generator of claim 1, wherein the plurality of conductors on each stator are connected as a star configuration, and the output of the first stator and output of the second stator are combined in a parallel.

11. The generator of claim 1, wherein N equals 9.

12. The generator of claim 1, wherein N equals 18.

13. A generator comprising:
    a rotor assembly having a plurality of rotors located about a shaft along a rotational axis, each rotor having a plurality of magnets circumferentially located about the rotational axis, wherein each of the plurality of rotors are separated by a gap, and adjacent magnets around each rotor and between the adjacent rotors are aligned to have alternating polarity;
    a stator assembly having a plurality of stators located about the shaft, wherein the number of stators is equal to the number of rotors, wherein each stator inner surface is in close proximity to a corresponding rotor outer surface, each stator having a plurality of conductors circumferentially located about the shaft and proximal to the plurality of magnets of corresponding rotors, the rotor assembly and the stator assembly is in a rotational relationship with one another;
    a rectifying system configured for processing electrical output of each conductor and generating a final output; and
    a monitoring system configured for controlling operation of the rectifying system based on operation parameters of the generator.

14. The generator of claim 13, wherein the plurality of optoisolators are independently controlled.

15. The generator of claim 13, wherein the plurality of conductors on each stator are connected as a star configuration, and the output of the first stator and output of the second stator are combined in a parallel.

16. The generator of claim 13, wherein the rectifying system includes at least one silicon-controlled rectifier.

17. The generator of claim 16, wherein the silicon-controlled rectifier is a tryristor.

18. The generator of claim 13, wherein the operation of the rectifying system is based on one or more of revolutions per minute (RPM), current value, voltage value, and phase relations between the rotor assembly and the stator assembly.

19. The generator of claim 13, wherein the monitoring system comprises a plurality of optoisolators controlled by a microprocessor.

20. The generator of claim 19, wherein the plurality of optoisolators are independently controlled by the micropocessor.

* * * * *